July 7, 1964 P. ROSENTHAL ETAL 3,139,751
ALL WEATHER VORTEX FREE-AIR THERMOMETER
Filed April 26, 1961 3 Sheets-Sheet 1

INVENTORS
PAUL ROSENTHAL
JOHN W. KURZROCK
BY
ATTORNEY

July 7, 1964   P. ROSENTHAL ETAL   3,139,751
ALL WEATHER VORTEX FREE-AIR THERMOMETER
Filed April 26, 1961   3 Sheets-Sheet 2
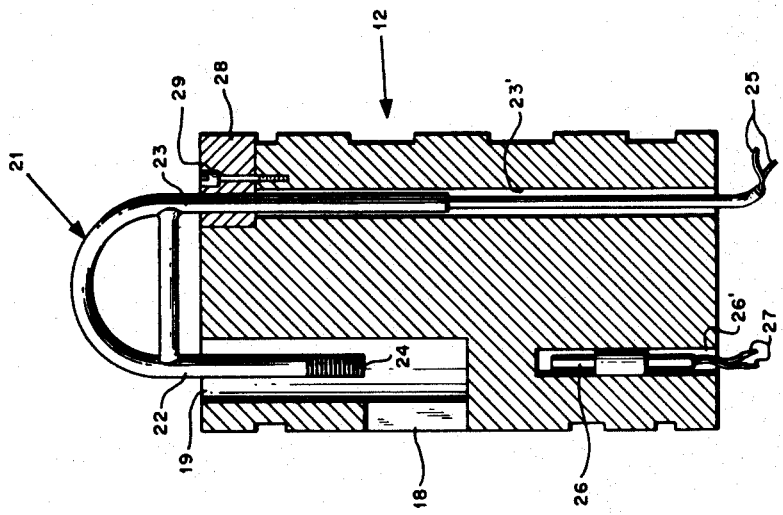
Fig. 3
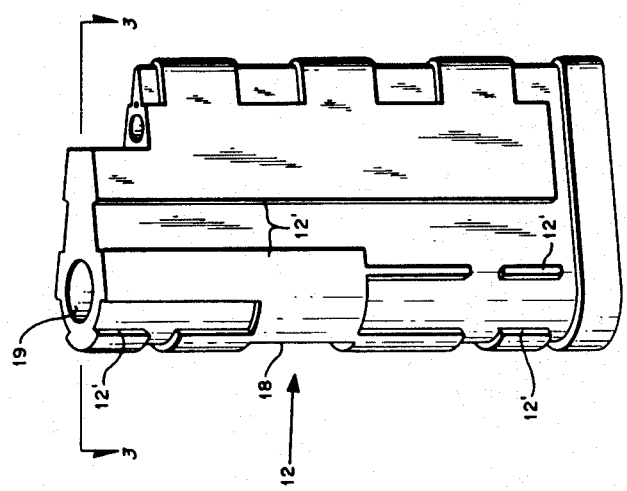
Fig. 2
INVENTORS
PAUL ROSENTHAL
JOHN W. KURZROCK
BY
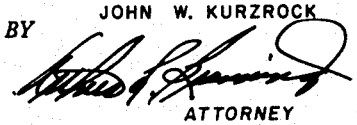
ATTORNEY July 7, 1964  P. ROSENTHAL ETAL  3,139,751
ALL WEATHER VORTEX FREE-AIR THERMOMETER
Filed April 26, 1961  3 Sheets-Sheet 3
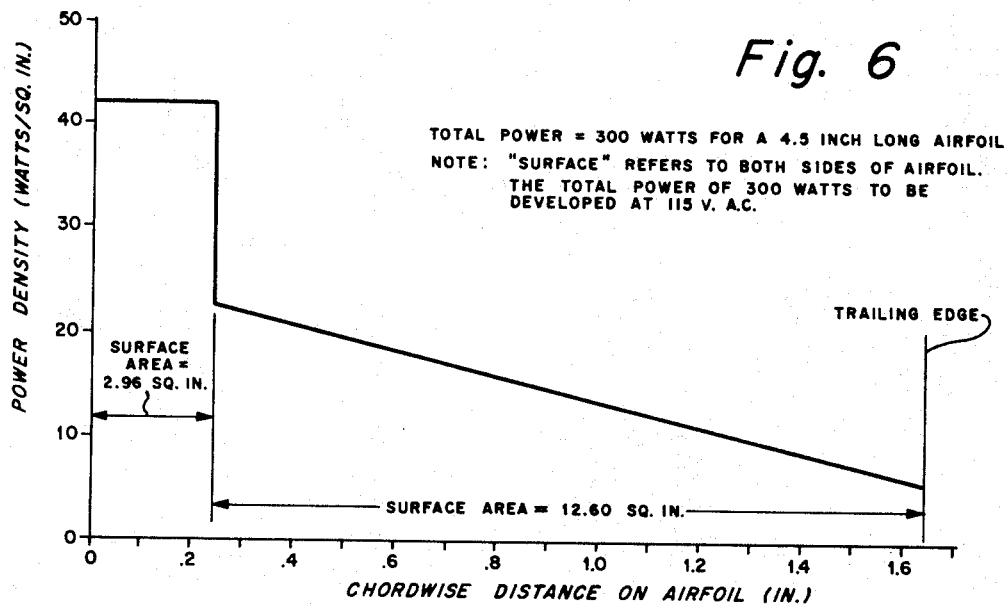
Fig. 6
TOTAL POWER = 300 WATTS FOR A 4.5 INCH LONG AIRFOIL
NOTE: "SURFACE" REFERS TO BOTH SIDES OF AIRFOIL.
THE TOTAL POWER OF 300 WATTS TO BE
DEVELOPED AT 115 V. A.C.
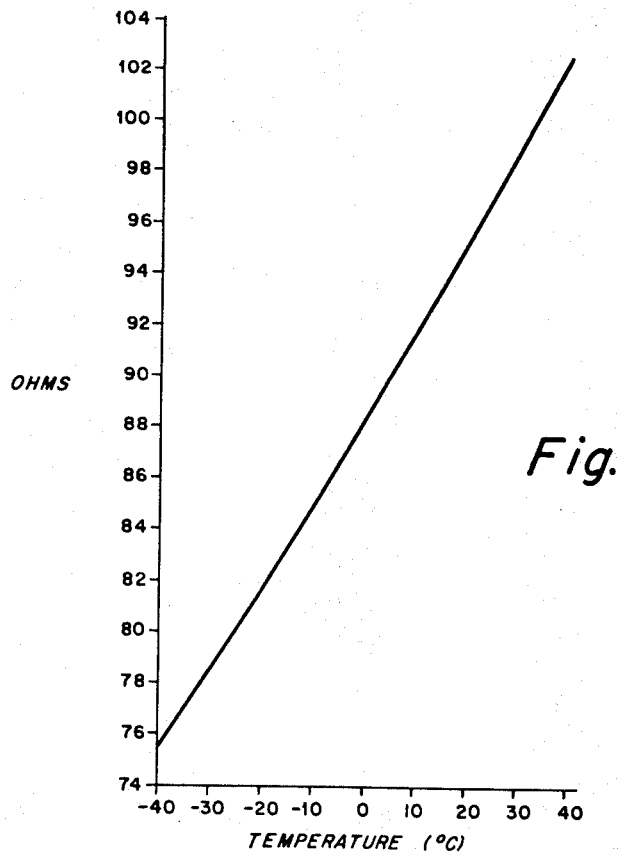
Fig. 5
INVENTORS
PAUL ROSENTHAL
JOHN W. KURZROCK
BY
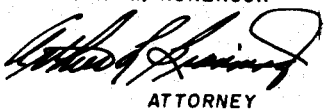
ATTORNEY United States Patent Office
3,139,751
Patented July 7, 1964

3,139,751
ALL WEATHER VORTEX FREE-AIR THERMOMETER
Paul Rosenthal, Tonawanda, and John W. Kurzrock, Cheektowaga, N.Y., assignors, by mesne assignments, to the United States of America as represented by the Secretary of the Navy
Filed Apr. 26, 1961, Ser. No. 105,822
4 Claims. (Cl. 73—349)

The present invention relates to a free-air thermometer of the vortex type and more particularly to a free-air thermometer of the vortex type which may be used in icing conditions.

All-weather operation is an important goal of most military aircraft and of all associated navigation and communication equipment. In common with other important atmospheric parameters, free-air temperature should be known to a high degree of accuracy during flight in all weather conditions. Essential to the computation of true airspeed from Mach number, free-air temperature also enters into ballistic and rocketry computations performed in fire-control systems and into the determination of flight paths for optimum fuel consumption. Further, free-air temperature is of interest in meterological surveys of the atmosphere. Finally, the measurement of free-air temperature for icing conditions in wind tunnels or in flight may be employed to describe a primary parameter of icing conditions and to assess the effectiveness of anti-icing equipment installed in various aircraft instruments. The need for a simple and reliable all-weather instrument for the direct measurement of free-air temperature is thus apparent.

The flow in a vortex thermometer is characterized by generation within the core of the thermometer of a local temperature very close to the free-air temperature of the undisturbed, outside atmosphere. By suitable design of external and internal dimensions, and of the thermal probe, free-air temperature can be measured by the thermometer over a wide range of Mach numbers, humidity, and pressure altitude. Reference may be made to U.S. Patent No. 2,826,070, issued March 11, 1958, to Box et al. for Vortex Tube Free Air Thermometer, if desired, for a more detailed description of thermometers of this type.

When a thermometer of the above-described type is employed in an aircraft operated in icing conditions, ice formation on the exterior surfaces and in the interior passages of the instrument alters the geometry thereof resulting in serious degradation in the accuracy of the temperature measurements made by the thermometer. More specifically, icing of the vortex thermometer can occur on the internal surfaces of the vortex tube, forming a portion of the instrument, as well as on the external, airfoil shaped housing enclosing the instrument. When ice obstructs the internal airflow in the thermometer, temperature measurement errors result because the vortex cooling effect in the instrument is reduced. Further, change of the airfoil shape by external ice build-up modifies the flow pattern around the airfoil and thereby affects the exhaust pressure of the vortex tube which results in further temperature measurement errors.

According to the invention, novel provision is made in a free-air thermometer of the vortex type to generate and to distribute heat in proper proportions to the external surfaces and to the interior passages of the thermometer to prevent ice build-up thereon and therein when the instrument is operated in icing conditions. The exact nature of the invention will become apparent upon consideration of the detailed description to be given below of an illustrative embodiment thereof.

Accordingly, it is a principal object of the present invention to extend the capabilities of a free-air thermometer of the vortex type to permit operation thereof in icing conditions.

It is a further and more specific object of the present invention to provide de-icing apparatus in a free-air thermometer of the vortex type.

Other objects and many attendant advantages of this invention will become apparent upon consideration of the following detailed specification when considered in connection with the annexed drawings wherein:

FIG. 2 is a pictorial representation of the thermometer core;

FIG. 3 is a cross section taken along line 3—3 of FIG. 2 showing the internal passages in the core and illustrating the mounting of various thermometer components therein;

FIG. 5 is a graph illustrating the temperature-resistance characteristic of a temperature probe which may be employed in the present invention; and FIG. 6 is a graph illustrating the distribution of heat to the surfaces of the airfoil shaped housing of an embodiment of the invention.

Figures 1, 4:
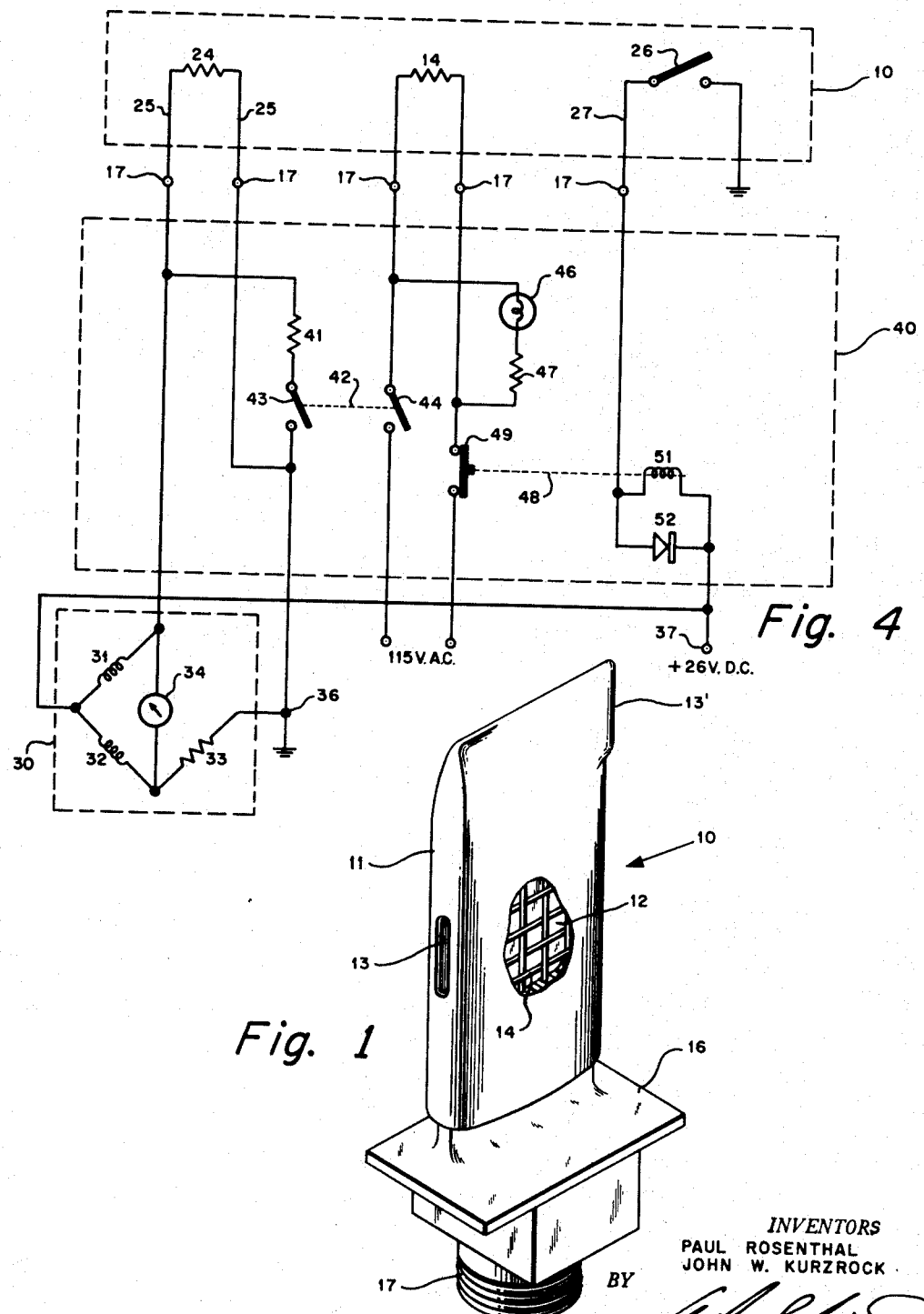
FIG. 1 is a pictorial representation, with portions cut away, of one form of the invention.
FIG. 4 is a schematic circuit diagram showing various portions of the present invention.

Referring now to FIG. 1, which illustrates a thermometer 10 constructed in accordance with the principles of the present invention, there is shown an airfoil shaped housing 11 enclosing a thermometer core portion 12 wherein communication with internal passages in core 12 (FIG. 3) is provided by an intake nozzle 13 and an exhaust nozzle 13' both formed in housing 11.

The structure thus far described is fastened by any suitable means (not shown) to a flange member 16 which is in turn fastened to an electrical connector 17 of the pin type. As may be apparent, flange 16 is adapted to mount thermometer structure 10 to an exterior surface of an aircraft whereby the leading edge of housing 11, including nozzle 13, is presented to airflow when the aircraft is in flight.

Referring now to FIGS. 2 and 3, core 12 comprises a precision brass casting having formed therein a nozzle portion 18 communicating with a vortex tube 19 and tangent to the cylindrical surface thereof. When received within housing 11, nozzle portion 18 of core 12 is in registry with nozzle portion 13 of the housing. A thermal probe 21 is provided and includes a pair of straight portions 22, 23 respectively received within vortex tube 19 and a bore 23'. Portion 22 of probe housing 21 terminates in a thermal sensor 24 adjacent nozzle 18. Sensor 24 is of the type wherein there is provided a temperature dependent resistor having linear characteristics, as shown in FIG. 5.

A pair of conductors 25 are provided to permit coupling of sensor 24 to temperature measuring circuitry of the type illustrated in FIG. 4.

Probe 21 may be secured to core 12 by any suitable means as by an apertured block 28 fastened to core 12 by a screw 29.

The structure and mode of operation of free-air thermometers of the vortex type do not per se form any part of the present invention. However, it should be noted that the geometry of airfoil 11, nozzles 13, 13', 18, and of vortex tube 19 are such as to create airflow in the vicinity of sensor 24 of such character that the sensor is exposed to a temperature substantially equal to the free-air temperature.

As may be seen by the reference to FIG. 4, sensor 24 is electrically coupled to form one arm of a bridge, the remaining elements of which comprise impedance elements 31, 32, and 33, and a measuring instrument 34, appropriately calibrated to read in degrees. The juncture of sensor 24 and impedance element 33 is connected to a grounded terminal 36, while the juncture of impedance elements 31, 32 is coupled to a terminal 37 to which an operating potential is applied. The circuitry described comprises a Wheatstone bridge indicator 30, the mode of operation of which is well understood in the art and will not therefore be further described.

As mentioned above, the formation of ice on airfoil 11 and within the internal passages of core 12 prevents useful operation of the thermometer in icing conditions, since ice formation disrupts the critical geometry necessary to proper operation of the instrument. The manner in which this difficulty is overcome according to the present invention will now be described.

Referring now again to FIG. 1, it may be seen, in the embodiment illustrated, that there are a plurality of wire resistance heating elements 14 embedded in housing 11. Housing 11 may be molded from an epoxy resin and may have deposited on the exterior surface thereof a thin metallic coating, for example, nickel. The metallic coating is needed to provide good erosion resistance and to provide for good heat conduction to the exterior surface of the housing. In a housing having a length of approximately 4½ inches, a width of approximately 1½ inches, and a depth of approximately ½ inch, the housing may have an overall thickness of 0.025 inch, and the metallic coating may have a thickness of 0.005 inch. To provide good adhesion between the plastic base and the metallic coating, it may be desirable to add a metal powder to the top layer of the plastic during curing.

It is to be understood that the housing structure above described is illustrative only. For example, thin film heaters may be employed in place of the wire heater structure described, and materials other than the epoxy resin mentioned may be employed in the housing structure. In general, soft, smooth, tough elastomers, and hard, smooth, ductile materials of high compressive strength exhibit the desired erosion resistant properties.

The accumulation of ice on housing 11 is nonuniform and tends to be heaviest adjacent the leading edge of the housing. Accordingly, for proper operation of the instrument, it is necessary to provide correspondingly nonlinear heat flow to the surface of the housing. This may be accomplished by distributing heating elements 14 within housing 11 so as to provide the greatest power density adjacent areas of greatest ice accumulation. A typical plot of power density as a function of chordwise distance along the airfoil shaped housing is shown in FIG. 6. It is also necessary to divide the available heat in proper ratio between the thermometer core 12 and the surface of housing 11. The manner in which this may be accomplished according to the invention will be described below.

As shown in FIG. 2, a plurality of ridges 12' are formed, for example, by milling, on the surface of core 12. Ridges 12' are in intimate contact with the interior surface of housing 11 while the depressed areas which separate ridges 12' provide an airspace between housing 11 and core 12. As understood in the art, the thermal impedance of brass is considerably less than that of air. The location and dimensioning of ridges 12' may be determined in accordance with standard heat flow equations in order to provide the desired distribution of heat flow to core 12 and to the surface of housing 11. The expressions for one dimensional steady state heat flow to the core and to the housing surface respectively are given below:

(1) $$q_i = \frac{T_w - T_b}{R_c + R_p + R_b + R_a} + \frac{T_w - T_b}{R_c + R_p + R_a}$$

(2) $$q_i = 0.41(T_w - T_b)$$

(3) $$q_e = \frac{T_w - T_s}{R_c + R_p + R_n}$$

(4) $$q_e = 2.0(T_w - T_s)$$

where:

$q_e$ = Heat flow to airfoil surface
$q_i$ = Heat flow to core
$R_a$ = Air thermal resistance
$R_b$ = Brass thermal resistance
$R_c$ = Contact thermal resistance
$R_n$ = Nickel coating thermal resistance
$R_p$ = Plastic thermal resistance
$T_b$ = Brass core temperature
$T_s$ = Airfoil surface temperature
$T_w$ = Wire temperature In one embodiment of the invention it has been determined that proper operation of the instrument may be obtained by apportioning 17 percent of the total available heat to core 12 and the remainder to the surface of housing 11. It may be appreciated that, in addition to providing for the division of heat between the interior and exterior portions of the thermometer, the dimensioning and location of ridges 12' may also be employed to aid in providing the proper power density distribution to the airfoil surface.

As will be apparent, Equations 2 and 4 are derived from Equations 1 and 3 by multiplying the known specific thermal resistance by the appropriate areas and path lengths determined from the geometry of the thermometer.

Since temperature measurement errors will be occasioned by the heat unavoidably supplied to sensor 24 when heater 14 is energized, as shown in FIG. 4, provision is made in embodiments of the invention to energize heater 14 only to the extent necessary to prevent ice accumulation within and on the exterior surfaces of the instrument and compensating means are provided to correct temperature measurement errors caused by operation of heater 14.

Referring now to FIG. 4, it may be seen that heater 14 is coupled through contact 44 of a manually operable switching means 42 and through contacts 49 of an electromagnetically actuated relay 48 to a source of operating potential. Operating winding 51 of relay 48 is coupled to a source of energizing potential through a thermally responsive switch means 26 which may comprise a mercury relay received within core 12 to be responsive to the temperature thereof (FIG. 3). Diode 52 is provided connected in parallel with operating winding 51 to bypass transient currents which may occur during operation of thermal relay 26.

Thermal relay 26 may be set to maintain the temperature of core 12 within 1° C. of a selected temperature, for example 25° C.

When it is expected that icing conditions will be encountered, manually operable switch 42 may be actuated, closing contacts 44 to thereby energize the heater circuitry above described. The energized condition of heater 14 is indicated by a neon lamp 46 connected in series with a current limiting resistor 47 across heater 14.

In order to prevent the occurrence of temperature measurement errors during operation of heater 14, a compensating resistor 41 is provided connected in parallel with sensor 24 through contact 43 of switch means 42. Contact 43 is actuated conjointly with contact 44.

For use with a sensor having the temperature resistance characteristics illustrated in FIG. 5, resistance 41 may have a magnitude of approximately 4.4 kilo-ohms. In one embodiment of the invention, heater 14 was selected to provide 300 watts of heating power.

As indicated in FIG. 4, switch 42, relay 48, indicator 46, compensating resistor 41, and associated circuitry may be contained within a switch box 40 which may be mounted within the aircraft respectively remote from thermometer 10 and indicator 30.

The above-described embodiment of the invention has been operated in icing conditions without significant deterioration of performance at ambient temperatures to −20° C., mean droplet sizes of 20 microns, and liquid water contents of 1.0 gram per cubic meter. The stated values of droplet size and liquid water content do not limit the ice-free range of the thermometer. For example, the thermometer has been operated ice-free at a liquid water content of 2.0 grams per cubic meter, a mean droplet size of 40 microns, and an ambient temperature of −16° C. The above performance characteristics were obtained with test speeds up to Mach number 0.6. This speed is higher than the speed requiring maximum heat input for anti-icing. Therefore, satisfactory performance may be expected to extend throughout the useful speed range of instruments of this type.

Obviously many modifications and variations of the present invention are possible in the light of the above teachings. It is therefore to be understood that within the scope of the appended claims the invention may be practiced otherwise than as specifically described.

What is claimed is:

1. A free-air thermometer of the vortex type comprising:
    a thermometer body having interior passages therein,
    an airfoil-shaped housing having exterior and interior surfaces enclosing said body and having apertures therethrough communicating with said interior passages,
    anti-icing means interposed between said surfaces of said housing for supplying heat in a predetermined distribution to said surfaces,
    a plurality of lands and adjacent indented areas formed on said thermometer body, said lands being in intimate contact with said interior surface of said housing whereby the thermal paths including said lands present relatively low thermal impedance and the thermal paths including said indented areas present relatively high thermal impedance.

2. A free-air thermometer of the vortex type comprising:
    a thermometer body having interior passages therein,
    an airfoil-shaped housing having exterior and interior surfaces enclosing said body and having apertures therethrough communicating with said interior passages,
    a plurality of electrical resistance elements imbedded in and interposed between said surfaces of said housing for supplying heat in a predetermined distribution to said surfaces,
    a source of electrical energy,
    means connecting said resistance elements to said source of electrical energy,
    a plurality of lands and adjacent indented areas provided on the surface of said thermometer body, said lands being in intimate contact with said interior surface of said housing whereby the thermal paths including said lands present relatively low thermal impedance and the thermal paths including said indented areas present relatively high thermal impedance.

3. A free-air thermometer of the vortex type comprising:
    a thermometer body having interior passages therein,
    an airfoil-shaped housing having exterior and interior surfaces enclosing said body and having apertures therethrough communicating with said interior passages,
    a plurality of electrical resistance elements imbedded in and interposed between said surfaces of said housing for supplying heat a predetermined distribution to said surfaces,
    a source of electrical energy connected to said resistance elements,
    a plurality of lands and adjacent indented areas provided on the surface of said thermometer body, said lands being in intimate contact with said interior surface of said housing whereby the thermal paths including said lands present relatively low thermal impedance and the thermal paths including said indented areas present relatively high thermal impedance,
    an electromagnetically actuated relay including an operating winding,
    said relay having the contacts thereof connected to said resistance and to said source of electrical energy,
    temperature responsive relay means received within one of said thermometer body passages,
    circuit means connecting said operating winding to said temperature responsive relay means,
    and a source of operating potential connected across said temperature responsive relay and said operating winding whereby said resistance element is connected and disconnected from said electrical energy source dependent upon the predetermined temperature.

4. A free-air thermometer of the vortex type comprising:
    a thermometer body having interior passages therein,
    an airfoil-shaped housing having exterior and interior surfaces enclosing said body and having apertures therethrough communicating with said interior passages,
    a plurality of electrical resistance elements imbedded in and interposed between said surfaces of said housing for supplying heat a predetermined distribution to said surfaces,
    a source of electrical energy connected to said resistance elements,
    a plurality of lands and adjacent indented areas provided on the surface of said thermometer body, said lands being in intimate contact with said interior surface of said housing whereby the thermal paths including said lands present relatively low thermal impedance and the thermal paths including said indented areas present relatively high thermal impedance,
    an electromagnetically actuated relay including an operating winding,
    said relay having the contacts thereof connected to said resistance and to said source of electrical energy,
    temperature responsive relay means received within one of said thermometer body passages,
    circuit means connecting said operating winding to said temperature responsive relay means,
    a source of operating potential connected across said temperature responsive relay and said operating winding whereby said resistance element is connected and disconnected from said electrical energy source dependent upon the predetermined temperature,
    a temperature measuring probe of the resistance type received within one of said thermometer body passages,
    compensating resistance means,
    and manually operable switch means having a pair of contacts connected in circuit with said resistance elements and another pair of contacts operative to connect the compensating resistance in circuit with said probe.

References Cited in the file of this patent
UNITED STATES PATENTS

| | | |
|---|---|---|
| 1,724,296 | MacGregor-Morris | Aug. 13, 1929 |
| 2,306,684 | Carbonara | Dec. 29, 1942 |
| 2,510,986 | Larkin | June 13, 1950 |
| 2,970,475 | Werner | Feb. 7, 1961 |
| 3,000,213 | Eves et al. | Sept. 19, 1961 |
| 3,030,807 | Scadron | Apr. 24, 1962 |